(12) United States Patent　　(10) Patent No.: US 12,333,198 B2
Horikawa　　(45) Date of Patent: Jun. 17, 2025

(54) DISPLAY METHOD, DISPLAY SYSTEM, AND STORAGE MEDIUM STORING PROGRAM

(71) Applicant: SEIKO EPSON CORPORATION, Tokyo (JP)

(72) Inventor: Fumiya Horikawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/470,527

(22) Filed: Sep. 20, 2023

(65) Prior Publication Data

US 2024/0094968 A1　　Mar. 21, 2024

(30) Foreign Application Priority Data

Sep. 20, 2022　(JP) .................................. 2022-148839

(51) Int. Cl.
　　*G06F 3/14*　　(2006.01)
　　*G06T 3/4007*　　(2024.01)
　　(Continued)

(52) U.S. Cl.
　　CPC .............. *G06F 3/14* (2013.01); *G06T 3/4007* (2013.01); *G06T 5/40* (2013.01); *G06V 10/56* (2022.01)

(58) Field of Classification Search
　　CPC ........... G06F 3/14; G06T 3/4007; G06T 5/40; G06V 10/56; G06V 10/98; G06V 2201/02;
　　(Continued)

(56) References Cited

U.S. PATENT DOCUMENTS 8,866,914 B2 * 10/2014 Murase ................ G09G 3/3611
　　　　　　　　　　　　　　　　　　　　　　　　　　348/184
10,250,859 B2 * 4/2019 Furui ........................ G06T 7/70
　　　　　　　　(Continued)

FOREIGN PATENT DOCUMENTS

JP　　2005-150779 A　　6/2005
JP　　2006-106691 A　　4/2006
　　　　(Continued)

OTHER PUBLICATIONS

Panasonic Corporation; Geometry Manager Pro Manual, May 2021, 2 pgs.
Panasonic Connect Co., Ltd., Software Applications, 6 pgs.

*Primary Examiner* — Grant Sitta
(74) *Attorney, Agent, or Firm* — Dority & Manning, P.A.

(57) ABSTRACT

A display method according to an aspect of the present disclosure including: sequentially displaying M different pattern images GOP, by a display device configured to display a display image, when an operation mode of the display device is a first operation mode, M being a natural number; correcting the display image based on a first captured image group acquired by imaging the M different pattern images GOP; sequentially displaying N different pattern images GOP by the display device when the operation mode of the display device is a second operation mode different from the first operation mode, N being a natural number smaller than the M; acquiring a second captured image group acquired by imaging the N different pattern images; and correcting the display image based on the second captured image group.

17 Claims, 8 Drawing Sheets

|  | GRADATION OF MEASUREMENT TARGET ||||||||  PATTERN IMAGE | INTERPO-LATION |
|---|---|---|---|---|---|---|---|---|---|---|
|  | 0 (BLACK) | 146 | 292 | 438 | 584 | 730 | 876 | 1023 |  |  |
| HIGH-ACCURACY MODE (0TH OPERATION MODE) | O | O | O | O | O | O | O | O | FIRST PATTERN IMAGE: 7<br>SECOND PATTERN IMAGE: 7<br>THIRD PATTERN IMAGE: 7<br>FOURTH PATTERN IMAGE: 1<br>TOTAL: 22 | CURVE INTERPO-LATION |
| INTERMEDIATE MODE (FIRST OPERATION MODE) | O |  | O |  |  | O |  | O | FIRST PATTERN IMAGE: 3<br>SECOND PATTERN IMAGE: 3<br>THIRD PATTERN IMAGE: 3<br>FOURTH PATTERN IMAGE: 1<br>TOTAL: 10 |  |
| SHORT-TIME MODE (SECOND OPERATION MODE) | O |  |  |  |  | O |  |  | FIRST PATTERN IMAGE: 1<br>SECOND PATTERN IMAGE: 1<br>THIRD PATTERN IMAGE: 1<br>FOURTH PATTERN IMAGE: 1<br>TOTAL: 4 | LINEAR INTERPO-LATION |

(51) Int. Cl.
 *G06T 5/40* (2006.01)
 *G06V 10/56* (2022.01)

(58) Field of Classification Search
 CPC ...... G09G 3/001; G09G 3/2003; G09G 3/006; H04N 9/3182
 See application file for complete search history.

(56) References Cited

U.S. PATENT DOCUMENTS

| | | | |
|---|---|---|---|
| 10,983,424 B2* | 4/2021 | Kobayashi | H04N 9/317 |
| 11,538,390 B2* | 12/2022 | Higashikawa | G09G 3/006 |
| 11,695,906 B2* | 7/2023 | Ishida | H04N 9/3182 348/744 |
| 2006/0055894 A1 | 3/2006 | Furihata | |
| 2008/0007574 A1* | 1/2008 | Yoshida | G09G 3/2007 345/690 |
| 2011/0032492 A1* | 2/2011 | Nara | H04N 9/317 353/121 |
| 2018/0013995 A1* | 1/2018 | Mizushiro | H04N 9/3182 |
| 2018/0220114 A1* | 8/2018 | Ouchi | H04N 9/3182 |
| 2019/0086833 A1* | 3/2019 | Yamada | G03G 15/5008 |
| 2019/0206355 A1* | 7/2019 | Morii | G09G 3/3677 |
| 2019/0219903 A1* | 7/2019 | Agustin | H04N 9/3147 |
| 2020/0117130 A1* | 4/2020 | Itagaki | G03G 15/50 |
| 2020/0128219 A1* | 4/2020 | Katsuki | G06T 7/521 |
| 2020/0221058 A1* | 7/2020 | Mano | H04N 5/64 |
| 2020/0314399 A1* | 10/2020 | Inukai | H04N 9/3135 |
| 2022/0329716 A1* | 10/2022 | Skotheim | H04N 13/254 |
| 2022/0368872 A1* | 11/2022 | Shishido | H04N 9/3194 |
| 2023/0215130 A1* | 7/2023 | Mine | H04N 5/74 382/167 |

FOREIGN PATENT DOCUMENTS

| | | |
|---|---|---|
| JP | 2016-161918 A | 9/2016 |
| JP | 2018-125719 A | 8/2018 |

* cited by examiner

| | GRADATION OF MEASUREMENT TARGET | | | | | | | | | PATTERN IMAGE | INTERPOLATION |
|---|---|---|---|---|---|---|---|---|---|---|---|
| | 0 (BLACK) | 146 | 292 | 438 | 584 | 730 | 876 | 1023 | | | |
| HIGH-ACCURACY MODE (0TH OPERATION MODE) | O | O | O | O | O | O | O | O | | FIRST PATTERN IMAGE: 7 SECOND PATTERN IMAGE: 7 THIRD PATTERN IMAGE: 7 FOURTH PATTERN IMAGE: 1 TOTAL: 22 | |
| INTERMEDIATE MODE (FIRST OPERATION MODE) | O | | O | | | O | | | O | FIRST PATTERN IMAGE: 3 SECOND PATTERN IMAGE: 3 THIRD PATTERN IMAGE: 3 FOURTH PATTERN IMAGE: 1 TOTAL: 10 | CURVE INTERPOLATION |
| SHORT-TIME MODE (SECOND OPERATION MODE) | O | | | | | O | | | | FIRST PATTERN IMAGE: 1 SECOND PATTERN IMAGE: 1 THIRD PATTERN IMAGE: 1 FOURTH PATTERN IMAGE: 1 TOTAL: 4 | LINEAR INTERPOLATION |

| OPERATION MODE | SETTING MODE | GRADATION OF MEASUREMENT TARGET | | | | | | | | PATTERN IMAGE | INTERPOLATION |
|---|---|---|---|---|---|---|---|---|---|---|---|
| | | 0 (BLACK) | 146 | 292 | 438 | 584 | 730 | 876 | 1023 | | |
| PRESET MODE (FIRST OPERATION MODE) | BRIGHT PRIORITY MODE | | | | | | ○ | ○ | ○ | FIRST PATTERN IMAGE: 3<br>SECOND PATTERN IMAGE: 3<br>THIRD PATTERN IMAGE: 3<br>TOTAL: 9 | CURVE INTERPOLATION |
| | DARK PRIORITY MODE | | ○ | ○ | | | | | ○ | FIRST PATTERN IMAGE: 3<br>SECOND PATTERN IMAGE: 3<br>THIRD PATTERN IMAGE: 3<br>TOTAL: 9 | |
| UNDEFINED MODE (SECOND OPERATION MODE) | USER DESIGNATION MODE | ANY ONE (DESIGNATED BY USER) | | | | | | | ○ | FIRST PATTERN IMAGE: 2<br>SECOND PATTERN IMAGE: 2<br>THIRD PATTERN IMAGE: 2<br>TOTAL: 6 | LINEAR INTERPOLATION |
| | AUTOMATIC MODE | ANY ONE (DETERMINED BASED ON MEASUREMENT RESULT IN AMBIENT LIGHT) | | | | | | | ○ | FIRST PATTERN IMAGE: 2<br>SECOND PATTERN IMAGE: 2<br>THIRD PATTERN IMAGE: 2<br>TOTAL: 6 | |

FIG. 8

| OPERATION MODE | SETTING MODE | GRADATION OF MEASUREMENT TARGET | | | | | | | | PATTERN IMAGE | INTERPOLATION |
|---|---|---|---|---|---|---|---|---|---|---|---|
| | | 0 (BLACK) | 146 | 292 | 438 | 584 | 730 | 876 | 1023 | | |
| PRESET MODE (FIRST OPERATION MODE) | BRIGHT PRIORITY MODE | | | | | | O | O | O | FIRST PATTERN IMAGE: 3<br>SECOND PATTERN IMAGE: 3<br>THIRD PATTERN IMAGE: 3<br>TOTAL: 9 | |
| | DARK PRIORITY MODE | | O | O | | | | | O | FIRST PATTERN IMAGE: 3<br>SECOND PATTERN IMAGE: 3<br>THIRD PATTERN IMAGE: 3<br>TOTAL: 9 | CURVE INTERPOLATION |
| HIGH-ACCURACY UNDEFINED MODE (FIRST OPERATION MODE) | HIGH-ACCURACY USER DESIGNATION MODE | ANY TWO OR MORE (DESIGNATED BY USER) | | | | | | | O | FIRST PATTERN IMAGE: 3 OR MORE<br>SECOND PATTERN IMAGE: 3 OR MORE<br>THIRD PATTERN IMAGE: 3 OR MORE<br>TOTAL: 9 OR MORE | |
| | HIGH-ACCURACY AUTOMATIC MODE | ANY TWO OR MORE (DETERMINED BASED ON MEASUREMENT RESULT IN AMBIENT LIGHT) | | | | | | | O | FIRST PATTERN IMAGE: 3 OR MORE<br>SECOND PATTERN IMAGE: 3 OR MORE<br>THIRD PATTERN IMAGE: 3 OR MORE<br>TOTAL: 9 OR MORE | |
| UNDEFINED MODE (SECOND OPERATION MODE) | USER DESIGNATION MODE | ANY ONE (DESIGNATED BY USER) | | | | | | | O | FIRST PATTERN IMAGE: 2<br>SECOND PATTERN IMAGE: 2<br>THIRD PATTERN IMAGE: 2<br>TOTAL: 6 | |
| | AUTOMATIC MODE | ANY ONE (DETERMINED BASED ON MEASUREMENT RESULT IN AMBIENT LIGHT) | | | | | | | O | FIRST PATTERN IMAGE: 2<br>SECOND PATTERN IMAGE: 2<br>THIRD PATTERN IMAGE: 2<br>TOTAL: 6 | LINEAR INTERPOLATION |

DISPLAY METHOD, DISPLAY SYSTEM, AND STORAGE MEDIUM STORING PROGRAM

The present application is based on, and claims priority from JP Application Serial Number 2022-148839, filed Sep. 20, 2022, the disclosure of which is hereby incorporated by reference herein in its entirety.

BACKGROUND

1. Technical Field

The present disclosure relates to a display method, a display system, and a storage medium storing a program.

2. Related Art

It is known a technique of correcting an image to be projected from a projector based on a result of imaging a pattern image projected from the projector.

For example, JP-A-2016-161918 discloses a technique in which a plurality of pattern images are projected from a projector, and a color tone of an image to be projected from the projector is corrected based on results of imaging the pattern images.

As the number of pattern images projected from the projector increases, the correction can be more accurate. However, since a time required for the correction also increases, a user needs to wait until the correction is completed.

SUMMARY

A display method according to an aspect of the present disclosure includes: sequentially displaying M different pattern images, by a display device configured to display a display image, when an operation mode of the display device is a first operation mode, M being a natural number; correcting the display image based on a first captured image group acquired by imaging the M different pattern images; sequentially displaying N different pattern images by the display device when the operation mode of the display device is a second operation mode different from the first operation mode, N being a natural number smaller than the M; acquiring a second captured image group acquired by imaging the N different pattern images; and correcting the display image based on the second captured image group.

A display system according to an aspect of the present disclosure includes: a display device configured to display a display image; an imaging device; and a processing device configured to execute: sequentially displaying M different pattern images by the display device when an operation mode of the display device is a first operation mode, M being a natural number, correcting the display image based on a first captured image group acquired by the imaging device imaging the M different pattern images, sequentially displaying N different pattern images by the display device when the operation mode of the display device is a second operation mode different from the first operation mode, N being a natural number smaller than the M, acquiring a second captured image group acquired by the imaging device imaging the N different pattern images, and correcting the display image based on the second captured image group.

A program according to an aspect of the present disclosure causes a computer to execute: sequentially displaying M different pattern images, by a display device configured to display a display image, when an operation mode of the display device is a first operation mode, M being a natural number; correcting the display image based on a first captured image group acquired by imaging the M different pattern images; sequentially displaying N different pattern images by the display device when the operation mode of the display device is a second operation mode different from the first operation mode, N being a natural number smaller than the M; acquiring a second captured image group acquired by imaging the N different pattern images; and correcting the display image based on the second captured image group.

DESCRIPTION OF EMBODIMENTS

Hereinafter, a preferred embodiment according to the present disclosure will be described with reference to the drawings. In the drawings, dimensions and scales of respective portions may be appropriately different from those of actual portions, and portions schematically shown for easy understanding may be included. In the following description, a scope of the present disclosure is not limited to aspects described in the following description unless there is a specific description to the effect that the present disclosure is limited. In addition, the scope of the present disclosure includes a scope equivalent to the aspects.

1. Embodiments

Configuration of Display System 1

Figure 1:
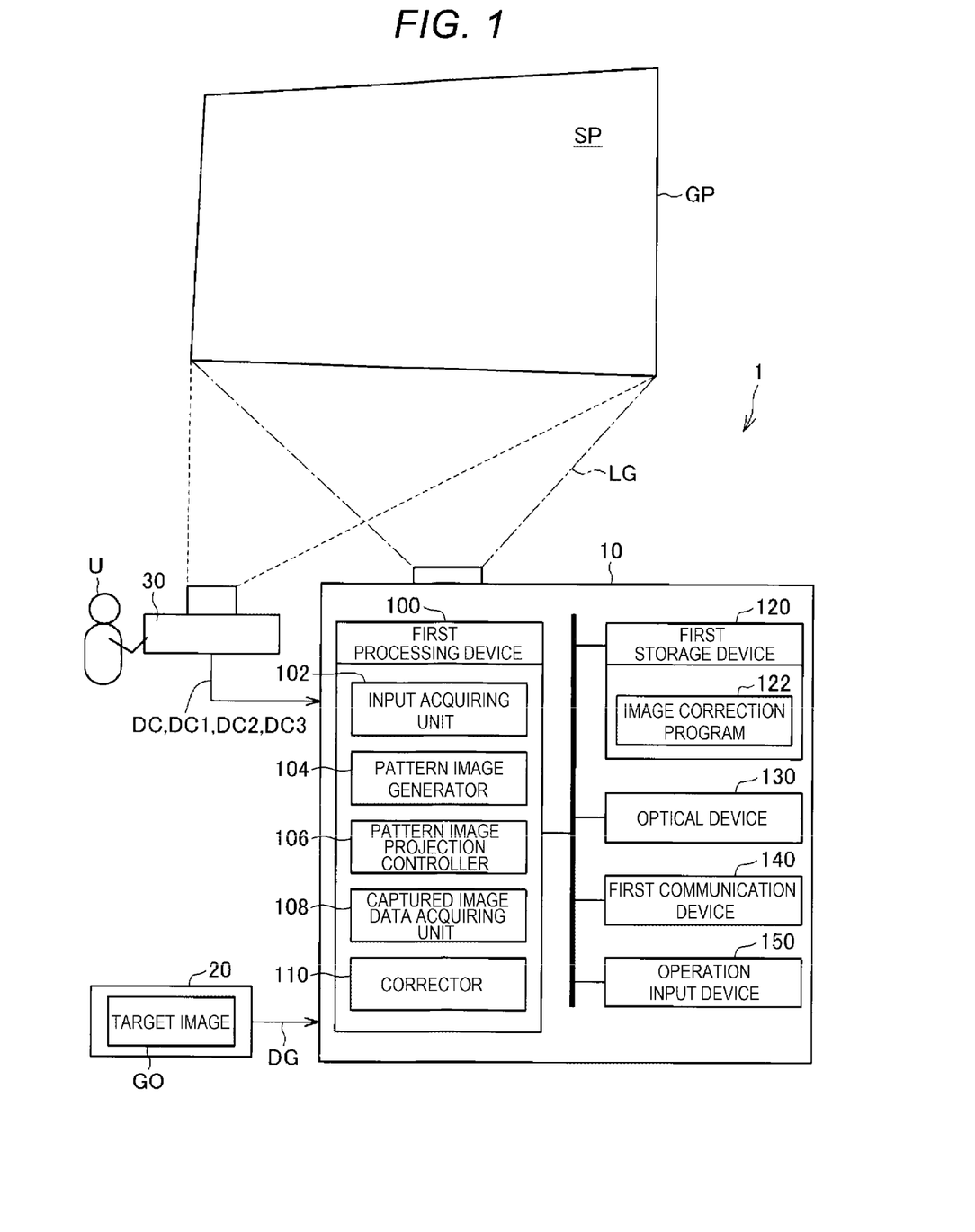
FIG. 1 is a schematic diagram showing an example of a display system according to an embodiment of the present disclosure.

FIG. 1 is a schematic diagram showing an example of a display system 1 according to the embodiment.

As shown in FIG. 1, the display system 1 includes a projector 10, an image supply device 20, and an imaging device 30.

The projector 10 is an example of a display device. Specifically, the projector 10 displays an image by projecting image light LG corresponding to an image to be projected onto a projection plane SP. That is, projecting the image light LG of the image onto the projection plane SP corresponds to displaying the image. The projection plane SP is a surface of a projected object onto which the image light LG is projected. The projected object is, for example, a screen, a whiteboard, or an indoor or outdoor wall surface. A surface of the projection plane SP is not necessarily a flat surface, and may include a curved surface, a step, unevenness, or the like. In the following description, an image to be projected onto the projection plane SP by the projector 10 is referred to as a "target image GO", and an image appearing on the projection plane SP by the projection is referred to as a "projection image GP". The target image GO is an example of a display image to be displayed by the display device.

The image supply device 20 is connected to the projector 10 in a wired or wireless manner, and supplies image data DG of the target image GO to the projector 10. The image supply device 20 is, for example, an optical disk reproduction device, a hard disk recorder, a television tuner device, a video game device, a personal computer, or a smartphone. A standard used for the connection between the image supply device 20 and the projector 10 is not limited. The image data DG corresponds to an image signal.

The imaging device 30 is a device that executes imaging in response to an operation of a user U. The imaging device 30 is connected to the projector 10 in a wired or wireless manner, and supplies captured image data DC acquired by imaging to the projector 10.

A standard used for the connection between the imaging device 30 and the projector 10 is not limited.

Configuration of Projector 10

The projector 10 includes a first processing device 100, a first storage device 120, an optical device 130, and an operation input device 150, and these devices are coupled to a bus.

The first processing device 100 includes one or more processors such as central processing units (CPU). The first storage device 120 is a storage medium that can be read by the first processing device 100. The first storage device 120 includes, for example, a nonvolatile memory and a volatile memory. The nonvolatile memory is, for example, a read only memory (ROM), an erasable programmable read only memory (EPROM), or an electrically erasable programmable read only memory (EEPROM). The volatile memory is, for example, a random access memory (RAM).

The optical device 130 is a device that emits, under control of the first processing device 100, the image light LG corresponding to the target image GO. Specifically, the optical device 130 includes a light source, a light modulation device, and an optical system. The light source is a discharge lamp, a semiconductor light source, or the like. Typical examples of the discharge lamp include a halogen lamp, a xenon lamp, and an ultra-high pressure mercury lamp. Typical examples of the semiconductor light source include a light-emitting diode (LED) and a laser diode. The light modulation device includes a light modulation element that optically modulates the light of the light source under the control of the first processing device 100. The light modulation element is, for example, a liquid crystal panel or a digital mirror device. The optical system includes one or more optical elements that adjust a magnification ratio of the light output from the light modulation device and an image position. The optical element is, for example, a lens or a mirror. Output light of the optical system is emitted as the image light LG from the optical device 130 and projected onto the projection plane SP.

The operation input device 150 is a device that receives an input operated by the user U. The operation input device 150 is, for example, a button provided on a main body of the projector 10 and a remote controller that remotely controls the projector 10. For example, the operation input device 150 receives an operation of designating an operation mode or a setting mode of a color correction, which will be described later, from the user U.

In the embodiment, the first storage device 120 stores an image correction program 122. The image correction program 122 is an example of a program. The projector 10 including the first processing device 100 that executes the image correction program 122 is also an example of a computer.

The image correction program 122 according to the embodiment includes a program for causing the first processing device 100 to execute the following series of processes. The series of processes is related to a display method of the projector 10. The series of processes includes projecting a pattern image GOP from the projector 10, acquiring the captured image data DC of the captured image acquired by imaging the projection image GP appearing on the projection plane SP when the pattern image GOP is projected, and correcting the target image GO projected from the projector 10 based on the captured image data DC.

In the embodiment, a correction of an image includes a color correction. The operation mode of the color correction includes three operation modes, i.e., a 0th operation mode, a first operation mode, and a second operation mode, which have different correction accuracy. The 0th operation mode is a mode in which the number of projected pattern images GOP is L. The first operation mode is a mode in which the number of projected pattern images GOP is M, which is less than L. The second operation mode is a mode in which the number of projected pattern images GOP is N, which is less than M. All of the L, M, and N are natural numbers.

The accuracy of the color correction increases as the number of projected pattern images GOP increases, and a time required for the image correction reduces as the number of projected pattern images GOP decreases. That is, the accuracy of the color correction and the required time are in a tread-off relationship. In the following description, the 0th operation mode having the largest number of projected pattern images is referred to as a "high-accuracy mode", and the second operation mode having the smallest number of projected pattern images is referred to as a "short-time mode". The first operation mode in which the number of projected pattern images is between the number of projected pattern images in the 0th operation mode and the number of projected pattern images in the second operation mode is referred to as an "intermediate mode".

The first processing device 100 executes the above-described image correction program 122 to implement each function required for the image correction of the target image GO. Specifically, the first processing device 100 functions as an input acquiring unit 102, a pattern image generator 104, a pattern image projection controller 106, a captured image data acquiring unit 108, and a corrector 110.

The input acquiring unit 102 is a functional unit that acquires an output signal of the operation input device 150 to receive an input of an operation indicating a designation of the operation mode by the user U.

The pattern image generator 104 is a functional unit that generates pieces of the image data DG of the number of pattern images GOP corresponding to the designated operation mode. Details of the pattern image GOP will be described below.

The pattern image projection controller 106 controls the optical device 130 based on the pieces of image data DG of the pattern images GOP generated by the pattern image generator 104 to sequentially project the image light LG corresponding to each of the pattern images GOP. As a result, the projection images GP corresponding to the respective pattern images GOP sequentially appear on the projection plane SP.

The captured image data acquiring unit 108 acquires a group of captured image data DC acquired by the imaging device 30 imaging the projection images GP appearing when the pattern images GOP are projected. In the following description, the groups of captured image data DC acquired in the 0th operation mode, the first operation mode, and the second operation mode are referred to as "0th captured image group data", "first captured image group data", and "second captured image group data", respectively.

The corrector 110 calculates a correction value for the color correction of the target image GO based on the 0th captured image group data, the first captured image group data, or the second captured image group data, and performs the color correction on the target image GO based on the correction value.

Image Correction: Color Correction

The image correction according to the embodiment includes the color correction. A process related to the color correction includes correcting a color of the target image GO in order to correct a color of the projection image GP into a target color. In the following description, the color of the projection image GP is referred to as a "current color", and the target color is referred to as a "target color".

In the embodiment, a plurality of different pattern images GOP described above are used to detect the current color of the projection image GP.

The pattern image GOP is an image having a predetermined gradation and predetermined color components or a pattern painted in black. The predetermined color components are color components constituting a color space.

In the embodiment, the color components are three color components including a red component (R), a green component (G), and a blue component (B). That is, the plurality of different pattern images GOP include four pattern images, that is, a first pattern image GOP1 painted with the red component of a first gradation, which is a predetermined gradation; a second pattern image GOP2 painted with the green component of the first gradation; a third pattern image GOP3 painted with the blue component of the first gradation; and a fourth pattern image GOP4 painted with a black component. The pattern image GOP according to the embodiment is an image in which an entire region is painted in a single color.

In the following description, the projection images GP that appear on the projection plane SP when the first pattern image GOP1, the second pattern image GOP2, the third pattern image GOP3, and the fourth pattern image GOP4 are projected are referred to as a "first projection image GP1", a "second projection image GP2", a "third projection image GP3", and a "fourth projection image GP4", respectively.

Figure 2:
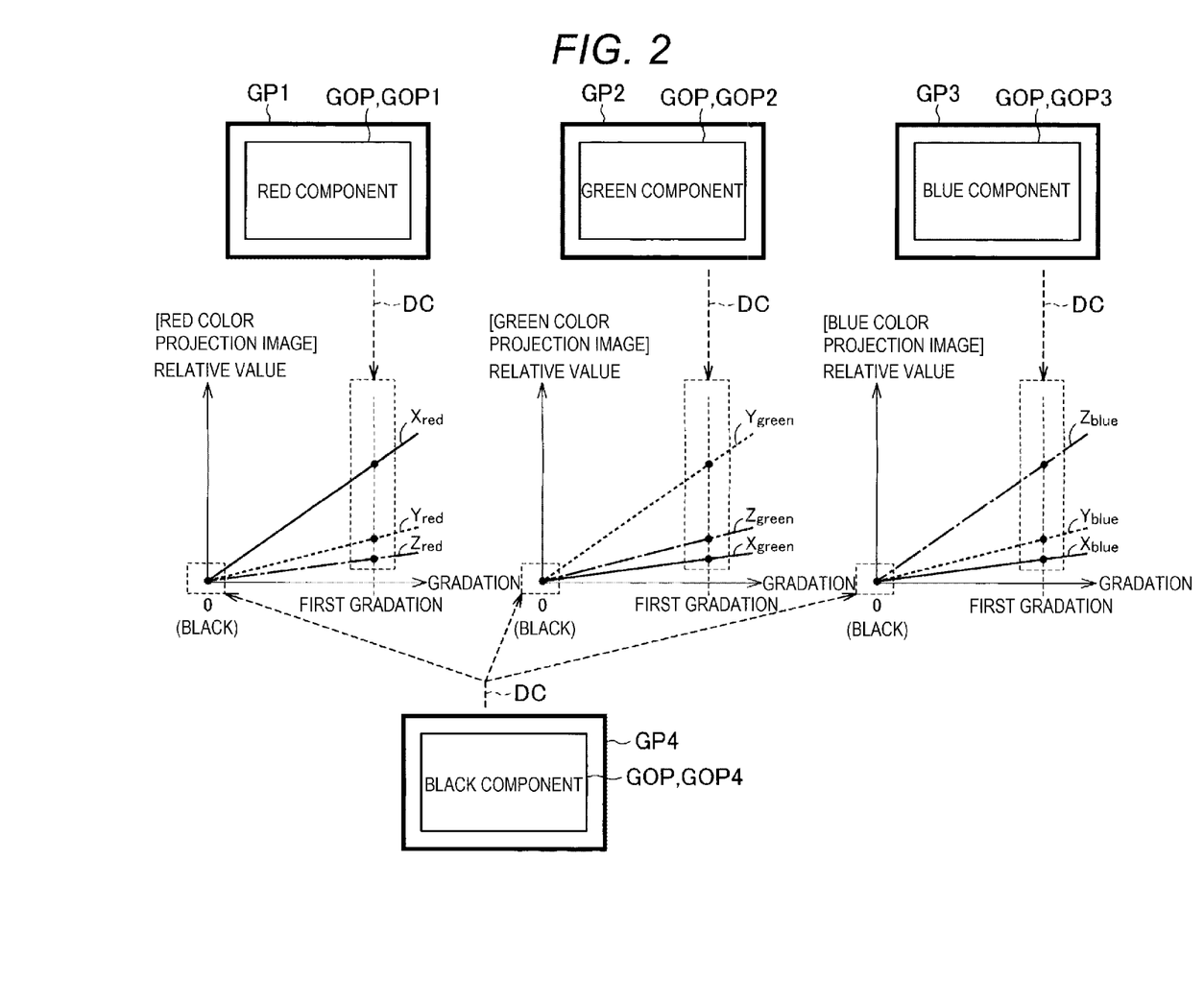
FIG. 2 is a diagram showing a pattern image, a captured image, a measurement result of a current color, and a linear interpolation.

As shown in FIG. 2, based on each piece of the captured image data DC of the first projection image GP1, the captured image data DC of the second projection image GP2, and the captured image data DC of the third projection image GP3, relative values of "X", "Y", and "Z" in a XYZ color system when the gradation is the first gradation are obtained for each of the red component, the green component, and the blue component. Further, since black corresponds to a gradation "0", relative values of "X", "Y", and "Z" in the XYZ color system in the case of the gradation "0" are obtained based on the captured image data DC of the fourth projection image GP4. Based on these relative values, the current color in the case of the first gradation and the current color in the case of the gradation "0" are identified.

Next, by performing a linear interpolation between two points of the gradation "0" and the first gradation, the current color is also identified for a gradation in which a measurement of the current color is not performed. Then, based on the current color and the target color, the correction value for each gradation is obtained.

Figure 3:
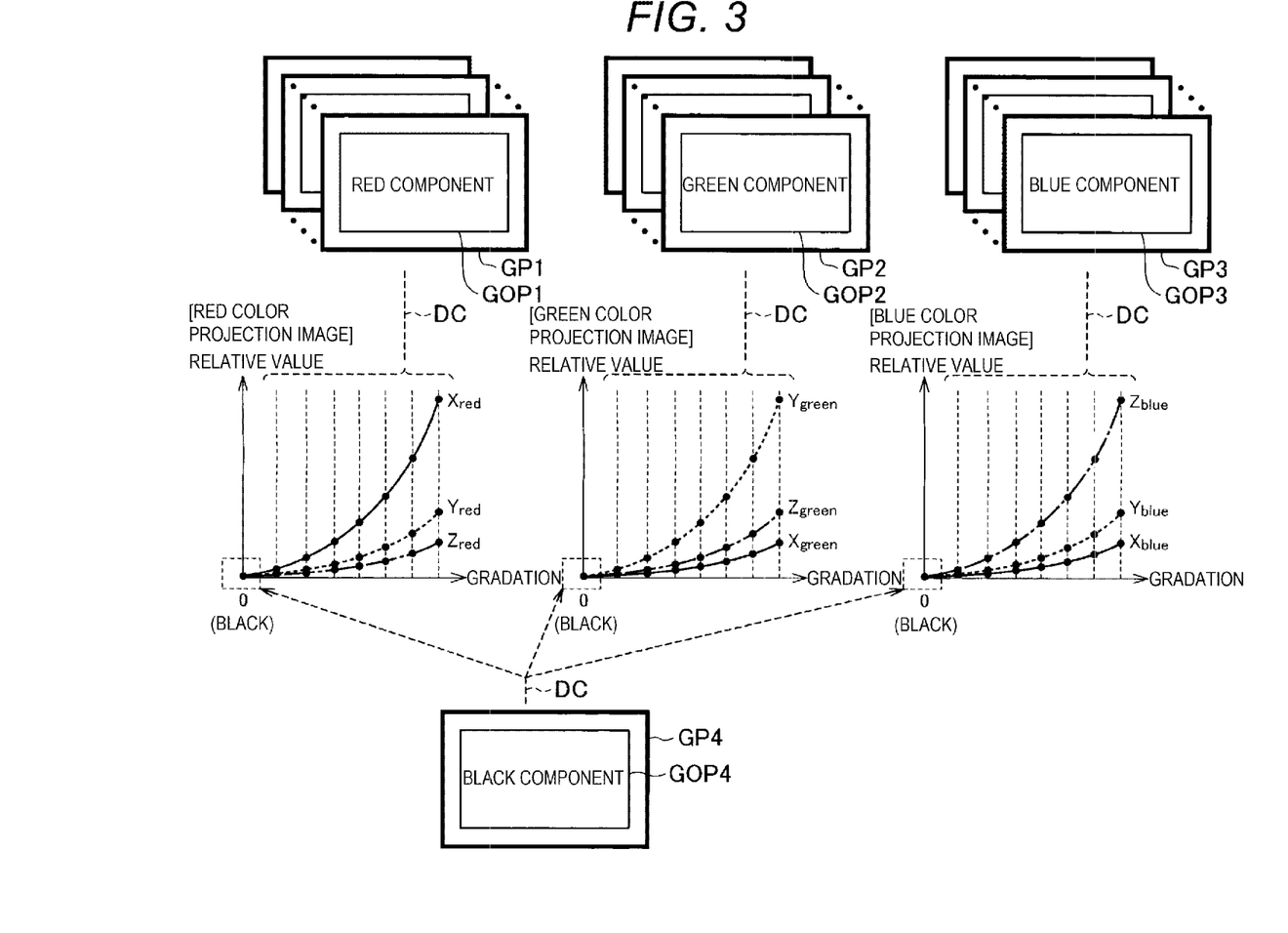
FIG. 3 is a diagram showing a pattern image, a captured image, a measurement result of a current color, and a curve interpolation.

Here, as the gradation of a current color measurement target increases, the accuracy of the interpolation of the correction value increases. For example, as shown in FIG. 3, by performing a measurement for each of three or more gradations, a curve interpolation with higher accuracy can be used instead of the linear interpolation, and the current color for each gradation can be obtained by the interpolation with higher accuracy. For example, a spline interpolation is used for the curve interpolation.

Figure 4:
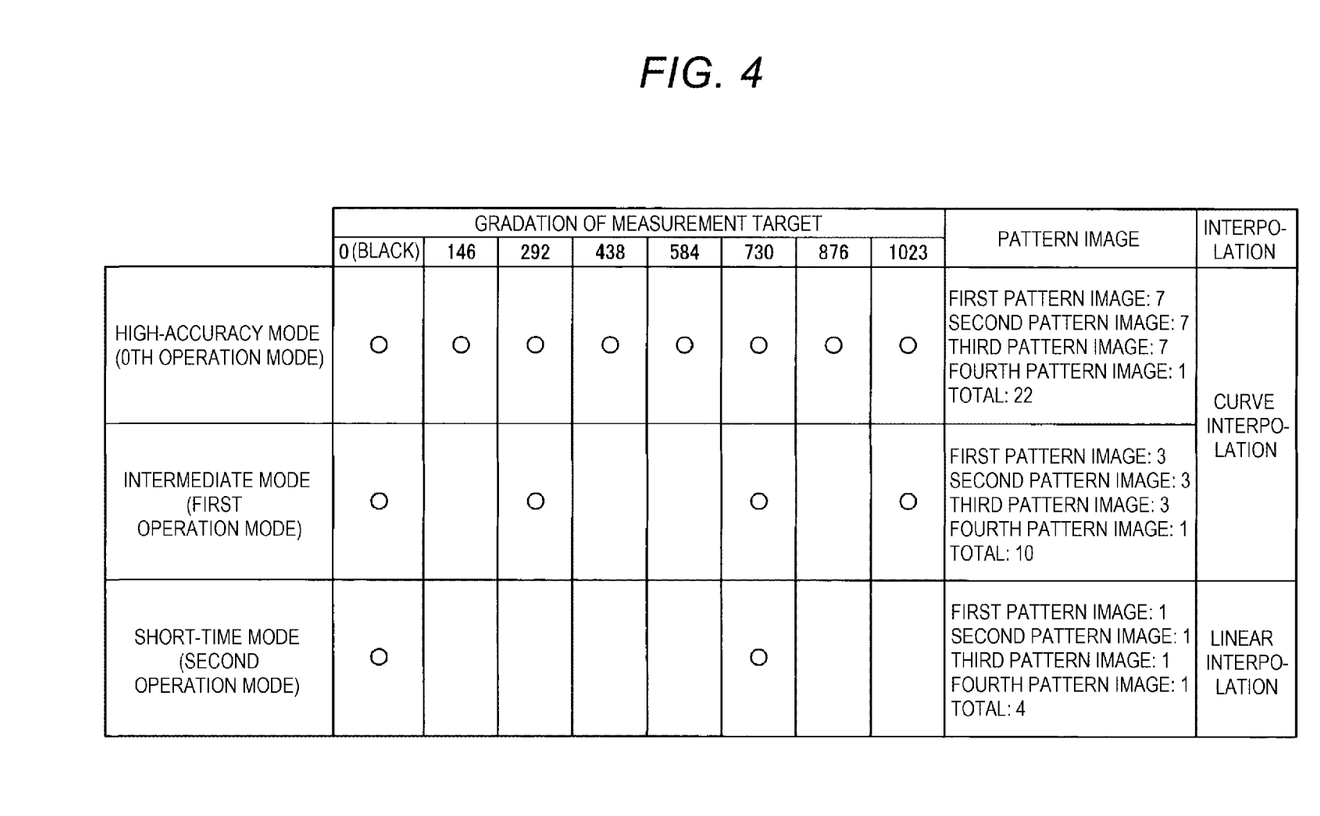
FIG. 4 is a diagram showing an example of operation modes of an image correction.

FIG. 4 is a diagram showing an example of the operation modes of the image correction.

The inventors experimentally finds that, by performing the measurement for at least seven gradations in addition to black, the current color can also be obtained with sufficient accuracy for an unmeasured gradation through the curve interpolation of the measurement results, and the accuracy of the correction value for each gradation can be improved.

As shown in FIG. 4, in the high-accuracy mode, the current color is measured for seven gradation stages and black. In this case, in the high-accuracy mode, seven first pattern images GOP1, seven second pattern images GOP2, and seven third pattern images GOP3 are used, and one (single) fourth pattern image GOP4 corresponding to black is used. Accordingly, in the high-accuracy mode, a total of 22 pattern images GOP are used.

On the other hand, in the short-time mode, the current color is measured for one gradation and black. Accordingly, in the short-time mode, a total of four pattern images GOP are used.

In addition, in the intermediate mode, the current color is measured for three gradations and black. Accordingly, in the intermediate mode, a total of ten pattern images GOP are used.

For the curve interpolation, at least three points may be measured. Accordingly, the measurement may be performed for the black and the other two gradations, and the number of pattern images GOP used in this case is seven in total.

In the embodiment, in each of the high-accuracy mode, the intermediate mode, and the short-time mode, the gradation as the current color measurement target is as follows. That is, as shown in FIG. 4, in the high-accuracy mode, there are eight gradations, i.e., seven gradations of "146", "292", "438", "584", "730", "876", and "1023", and the gradation of "0" (black). In the intermediate mode, there are four gradations, i.e., three gradations of "292", "730", and "1023", and the gradation of "0" (black). In the short-time mode, there are two gradations one gradation of "730" and the gradation of "0" (black).

Operations of Display System 1

Figure 5:
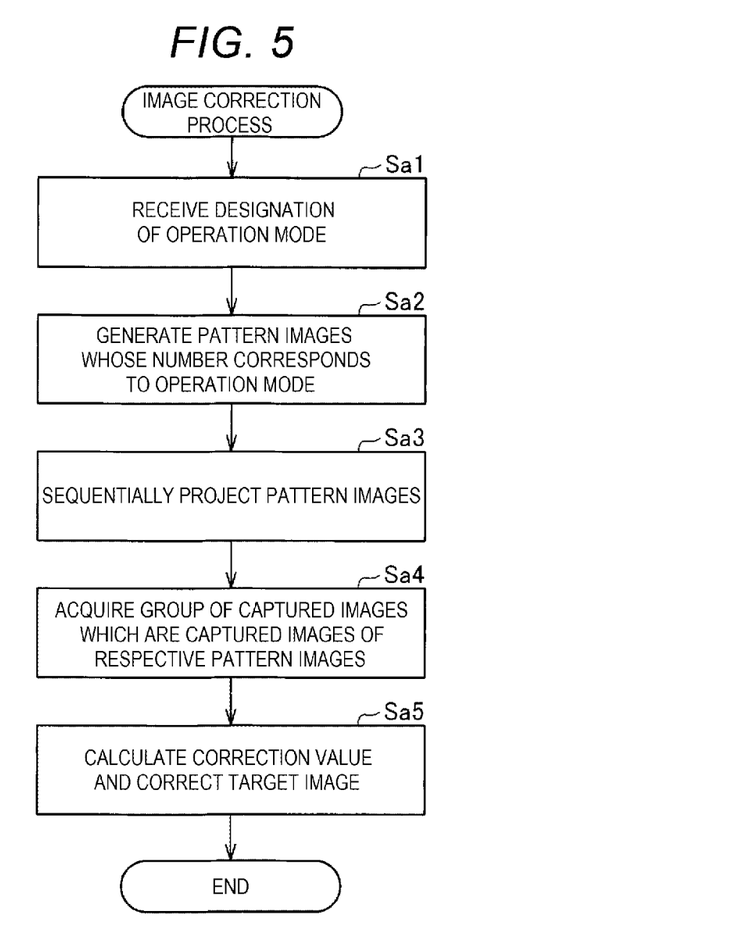
FIG. 5 is a flowchart showing an example of an image correction process.

FIG. 5 is a flowchart of an image correction process.

In the projector 10, when the first processing device 100 executes the image correction program 122, as shown in FIG. 5, the input acquiring unit 102 receives an input of an operation for designating the operation mode (step Sa1). Next, the pattern image generator 104 generates the pieces of image data DG of the plurality of different pattern images GOP according to the designated operation mode (step Sa2). Specifically, the pattern image generator 104 generates 22 pattern images GOP when the high-accuracy mode is designated, generates 10 pattern images GOP when the intermediate mode is designated, and generates 4 pattern images GOP when the short-time mode is designated.

Then, the pattern image projection controller 106 controls the optical device 130 based on the pieces of image data DG of the pattern images GOP to sequentially project the image light LG corresponding to each of the pattern images GOP (step Sa3).

In step Sa3, the projection images GP corresponding to the respective pattern images GOP sequentially appear on the projection plane SP. Then, the user U operates the imaging device 30 to perform imaging, thereby acquiring the pieces of captured image data DC of the projection images GP.

The captured image data acquiring unit 108 acquires the pieces of captured image data DC of the captured images acquired by the imaging device 30 imaging the projection images GP (step Sa4). Specifically, when the high-accuracy mode is designated, the captured image data acquiring unit 108 acquires the above-described 0th captured image group data including the pieces of captured image data DC of the respective captured images of the 22 pattern images GOP. When the intermediate mode is designated, the captured image data acquiring unit 108 acquires the above-described first captured image group data including the pieces of captured image data DC of the respective captured images of the 10 pattern images GOP. When the short-time mode is designated, the captured image data acquiring unit 108 acquires the above-described second captured image group data including the pieces of captured image data DC of the respective captured images of the 4 pattern images GOP.

Then, the corrector 110 calculates the correction value for correcting the target image GO based on the 0th captured image group data, the first captured image group data, or the second captured image group data, and performs the correction on the target image GO based on the corresponding correction value (step Sa5).

In step Sa5, when the corrector 110 calculates the correction value based on the 0th captured image group data or the first captured image group data, the corrector 110 calculates the correction value by obtaining the current color of the unmeasured gradation by the curve interpolation. When the corrector 110 calculates the correction value based on the second captured image group data, the corrector 110 calculates the correction value by obtaining the current color of the unmeasured gradation by the linear interpolation.

As described above, the first processing device 100 in the projector 10 according to the embodiment executes the following series of processes. That is, the series of processes include sequentially displaying M different pattern images GOP when the operation mode of the projector 10 projecting the target image GO is the first operation mode, M being a natural number, acquiring the first captured image group acquired by imaging the projection images GP obtained by projecting the M pattern images GOP, correcting the target image GO based on the first captured image group, sequentially displaying N different pattern images when the operation mode of the projector 10 is the second operation mode different from the first operation mode, N being a natural number, acquiring a second captured image group acquired by imaging the projection images GP obtained by projecting the N pattern images GOP, and correcting the target image GO based on the second captured image group.

Accordingly, when the projector 10 operates in the first operation mode, the correction can be performed with higher accuracy than that in the second operation mode. In addition, when the projector 10 operates in the second operation mode, the correction can be performed in a time shorter than that in the first operation mode.

In the embodiment, the natural number N is 4 or more. The N different pattern images GOP include one or more red first pattern images GOP1, one or more green second pattern images GOP2, one or more blue third pattern images GOP3, and one black fourth pattern image GOP4.

By using the N different pattern images GOP, the color correction of the target image GO can be performed in a short time.

In the embodiment, the natural number M is 7 or more. The M different pattern images GOP include two or more first pattern images GOP1 that are different in gradation, two or more second pattern images GOP2 that are different in gradation, two or more third pattern images GOP3 that are different in gradation, and one fourth pattern image GOP4. The correction of the target image GO based on the first captured image group includes a correction of the target image GO based on the correction value calculated using the curve interpolation based on the first captured image group. The correction of the target image GO based on the second captured image group includes a correction of the target image GO based on the correction value calculated using the linear interpolation, which is different from the curve interpolation, based on the second captured image group.

Accordingly, in the first operation mode, the correction value of the color correction is obtained with accuracy higher than that in the second operation mode. In the second operation mode, the correction value of the color correction is obtained in a time shorter than that in the first operation mode.

In the embodiment, the first processing device 100 executes processes of receiving an operation for designating the operation mode, setting the operation mode to the first operation mode when the received operation is an operation for designating the first operation mode, and setting the operation mode to the second operation mode when the received operation is an operation for designating the second operation mode.

Therefore, the user U can select a desired operation mode from the first operation mode and the second operation mode by an operation.

2. Modification

The embodiment described above may be modified in various ways. Aspects of a specific modification that can be applied to the embodiment described above will be described below. Further, two or more aspects freely selected from the following examples may be appropriately combined within a range in which the two or more aspects do not contradict each other.

Modification 1

In the above-described embodiment, three modes including the "high-accuracy mode", the "intermediate mode", and the "short-time mode" in which the numbers of gradations of the measurement target are different are exemplified as the operation modes of the image correction. However, the number of modes may be at least two or more. For example, the operation mode may include two modes, i.e., the "high-accuracy mode" and the "intermediate mode", two modes, i.e., the "high-accuracy mode" and the "short-time mode", or two modes, i.e., the "intermediate mode" and the "short-time mode". Further, for example, the operation mode may include a mode in which the number of gradations of the measurement target is more than that in the "high-accuracy mode".

Modification 2

The operation mode may include modes in which the numbers of gradations of the measurement target are the same, in addition to modes in which the numbers of gradations of the measurement target are different.

Figure 6:
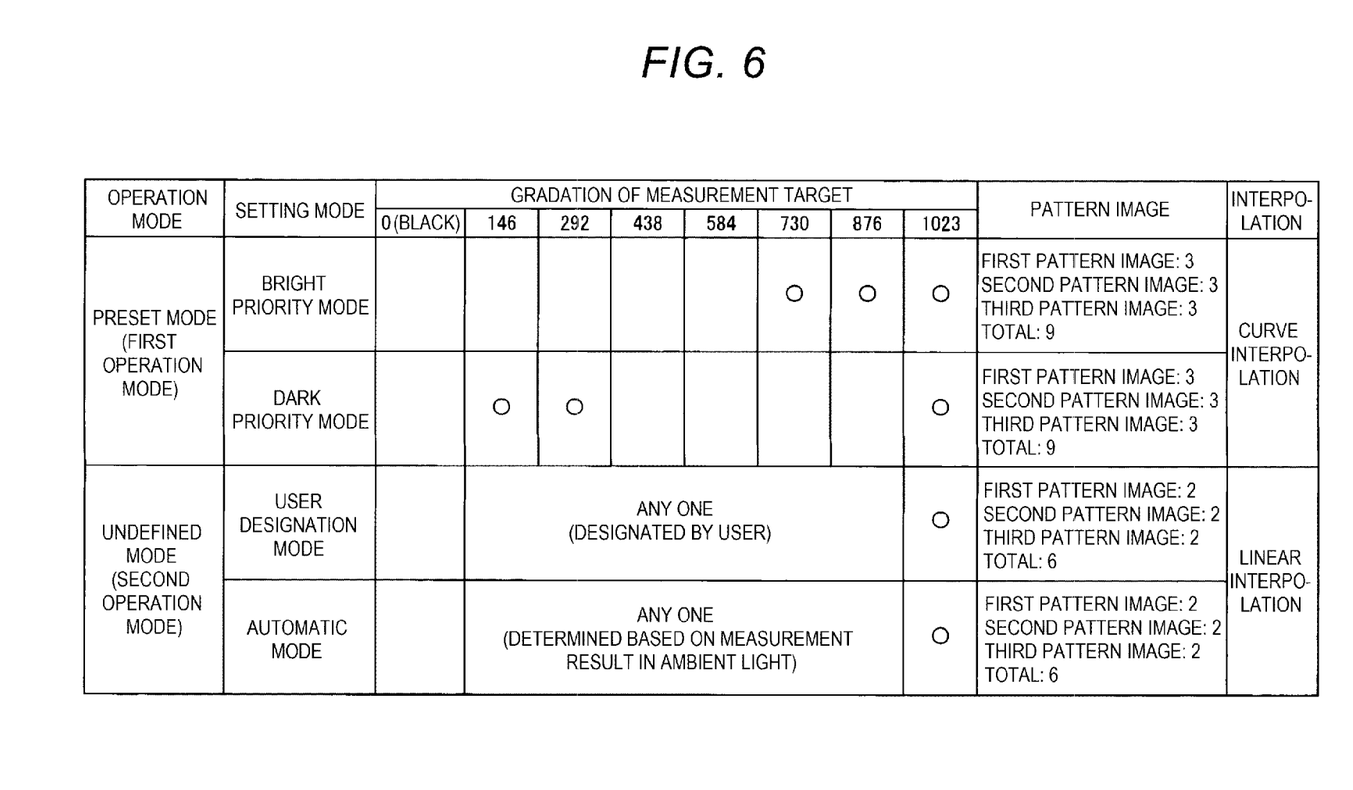
FIG. 6 is a diagram showing operation modes according to a modification of the present disclosure.

FIG. 6 is a diagram showing operation modes according to the modification.

As shown in FIG. 6, the operation mode according to the modification includes two modes, that is, a preset mode and an undefined mode. The preset mode is a mode in which the gradations of the measurement target are designated in advance, and the undefined mode is a mode in which the gradations of the measurement target are undefined. The preset mode is a mode corresponding to the first operation mode. That is, in the preset mode, the M different pattern images GOP are displayed by the projection of the projector 10. On the other hand, the undefined mode is a mode corresponding to the second operation mode. That is, in the undefined mode, the N different pattern images GOP, in which N is smaller than M, are displayed by the projection of the projector 10.

In the modification, in the preset mode, the measurement is performed for three gradations, and a total of nine different pattern images GOP are used. On the other hand, in the undefined mode, the measurement is performed for two gradations, and a total of six different pattern images GOP are used.

Each of the preset mode and the undefined mode includes a first setting mode and a second setting mode different from each other. In the modification, the first setting mode and the second setting mode are modes in which some of the different gradations of the measurement target are included and the numbers of gradations of the measurement target, that is, the number of pattern images GOP used for the measurement are the same.

In the modification, the preset mode includes a bright priority mode and a dark priority mode as the first setting mode and the second setting mode, and the undefined mode includes a user designation mode and an automatic mode as the first setting mode and the second setting mode.

The bright priority mode is a setting mode suitable when the gradation of the target image GO is relatively bright. This type of target image GO corresponds to an image with a white background, such as an image of a presentation material and an image of a screen of a personal computer. The dark priority mode is a setting mode suitable when the gradation of the target image GO is relatively dark. This type of target image GO corresponds to an image with a background of a color other than white, such as a frame image that constitutes a moving image such as a movie.

In the bright priority mode, a plurality of relatively high gradations are designated in advance for the measurement target, and in the dark priority mode, relatively dark gradations are designated in advance for the measurement target.

Specifically, as shown in FIG. 6, in the bright priority mode, the gradation "1023" corresponding to a second gradation and the gradation "876" and the gradation "730" corresponding to third gradations darker than the second gradation are designated in advance as the gradations of the measurement targets. In addition, in the dark priority mode, the gradation "1023" corresponding to the second gradation and the gradation "292" and the gradation "146" corresponding to fourth gradations darker than the third gradation of the bright priority mode are designated in advance as the gradations of the measurement targets.

In the modification, the first pattern image GOP1, the second pattern image GOP2, and the third pattern image GOP3 having the gradation "1023" corresponding to the second gradation correspond to fifth pattern images. The first pattern image GOP1, the second pattern image GOP2, and the third pattern image GOP3 each having the gradations "876" and "730" corresponding to the third gradations correspond to sixth pattern images. The first pattern image GOP1, the second pattern image GOP2, and the third pattern image GOP3 each having the gradations "292" and "146" corresponding to the fourth gradations correspond to seventh pattern images.

In any of the bright priority mode and the dark priority mode, since the number of gradations of the measurement targets of the current color is three or more, the corrector 110 interpolates the current color for the unmeasured gradation by using the curve interpolation, and calculates the correction value for each gradation. In this case, in the bright priority mode, since the measurement is performed with respect to the relatively high gradations, the accuracy of the correction value is improved in a high gradation range among 1024 gradation ranges. In contrast, in the dark priority mode, since the measurement is performed for the relatively dark gradation, the accuracy of the correction value is improved in a dark gradation range among the 1024 gradation ranges.

The user designation mode is a mode in which one gradation of the measurement target is designated by an input of an operation of the user U. In the user designation mode, the measurement is performed for the two gradations of the gradation designated by the input of the operation of the user U and the gradation "1023" corresponding to the second gradation. The automatic mode is a mode in which measurement is performed for two gradations of the gradation determined according to ambient light and the gradation "1023" corresponding to the second gradation. The ambient light is light existing in a space in which the projection plane SP is placed, and is, for example, illumination light or sun light.

In the modification, the first pattern image GOP1, the second pattern image GOP2, and the third pattern image GOP3 having the gradation designated by the input of the operation of the user U correspond to eighth pattern images. In addition, a pattern image GOP, which will be described later, used for determining a gradation according to the ambient light corresponds to a ninth pattern image, and the first pattern image GOP1, the second pattern image GOP2, and the third pattern image GOP3 having the gradation determined according to the ambient light correspond to tenth pattern images.

In any of the user designation mode and the automatic mode, since the number of gradations of the measurement target of the current color is two, the corrector 110 interpolates the current color for the unmeasured gradation by using the linear interpolation, and calculates the correction value for each gradation.

In the modification, as shown in FIG. 6, the gradation of the measurement target includes the gradation "1023" corresponding to a maximum brightness in any operation mode and setting mode. As a result, when the current colors of all the gradations from the maximum to the minimum are obtained using the interpolation, it is possible to reduce an error in each gradation.

Figure 7:
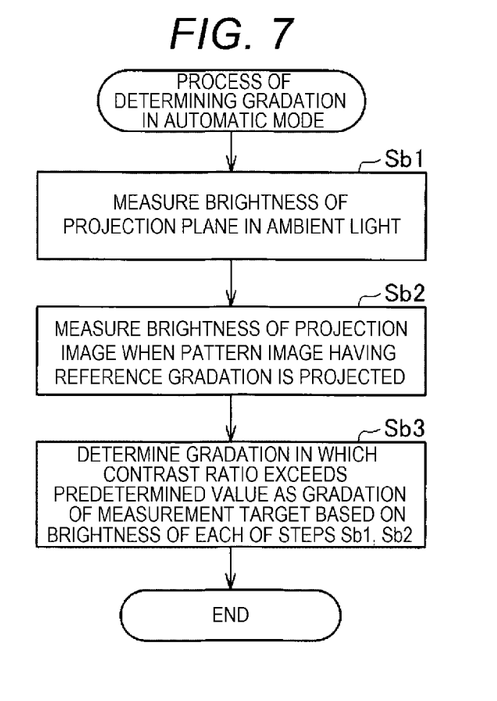
FIG. 7 is a flowchart showing an example of a process of determining a gradation in an automatic mode.

FIG. 7 is a flowchart showing an example of a process of determining a gradation in the automatic mode.

More specifically, in the automatic mode, in a case in which the projection plane SP is illuminated by the ambient light, when a contrast ratio between a brightness of the projection plane SP due to the ambient light and a brightness of the projection image GP is lower than a predetermined threshold, a measurement result with sufficient accuracy cannot be obtained.

In the automatic mode, the gradation of the measurement target is determined as follows. That is, as shown in FIG. 7, the projector 10 first measures the brightness of the projection plane SP in the ambient light (step Sb1), and measures the brightness of the projection image GP when the pattern image GOP having a reference gradation is projected (step Sb2). Then, based on the measurement result of each brightness, the projector 10 identifies any one gradation in which the contrast ratio with respect to the brightness of the projection plane SP in the ambient light exceeds a predetermined value from the 1024 gradation ranges, and designates the gradation as the gradation of the measurement target (step Sb3).

According to this process, since an inappropriate gradation with respect to the brightness of the ambient light is excluded from the measurement target, a decrease in the accuracy of the correction is prevented, and since the measurement target is reduced, the correction can be performed in a short time.

The operation of the projector 10 in each step shown in FIG. 7 will be described more specifically.

In step Sb1, first, the pattern image generator 104 generates the image data DG of the black fourth pattern image GOP4. Next, the pattern image projection controller 106 projects the image light LG of the fourth pattern image GOP4 on the projection plane SP based on the image data DG of the fourth pattern image GOP4. By this projection, the fourth projection image GP4 corresponding to the fourth pattern image GOP4 appears on the projection plane SP. Next, the user U images the fourth projection image GP4 using the imaging device 30. The captured image data acquiring unit 108 acquires the captured image data DC of a fourth captured image acquired by the imaging device 30 imaging the fourth projection image GP4. A brightness of the fourth captured image indicates the brightness on the projection plane SP in the ambient light.

In step Sb2, first, the pattern image generator 104 generates the image data DG of the ninth pattern image having the reference gradation. This reference gradation corresponds to a fifth gradation. In the modification, the fifth gradation uses a gradation having the maximum brightness in the entire gradation range, that is, "1023". The white pattern image GOP is used as the ninth pattern image.

Next, the pattern image projection controller 106 projects the image light LG of the ninth pattern image on the projection plane SP based on the image data DG of the ninth pattern image. By this projection, a ninth projection image corresponding to the ninth pattern image appears on the projection plane SP. Next, the user U images the ninth projection image using the imaging device 30. The captured image data acquiring unit 108 acquires the captured image data DC of a ninth captured image acquired by the imaging device 30 imaging the ninth projection image. A brightness of the ninth captured image indicates the brightness of the ninth projection image obtained by projecting the ninth pattern image having the reference gradation.

It should be noted that an execution order of step Sb1 and step Sb2 may be reversed.

In step Sb3, for example, the corrector 110 of the first processing device 100 identifies, based on the brightness of each of the fourth captured image and the ninth captured image, any one of the gradations in which the contrast ratio with respect to the brightness of the projection plane SP in the ambient light, that is, the fourth captured image is equal to or greater than the predetermined threshold from the 1024 gradation ranges, and designates the corresponding gradation as the gradation of the measurement target.

In the automatic mode according to the modification, the gradation "1023" may be excluded from the gradations of the measurement targets for obtaining the correction value, and the measurement result of the black (gradation "0") fourth pattern image GOP4 may be used instead.

According to the modification, the first operation mode includes the bright priority mode which is a first setting mode, and the dark priority mode which is a second setting mode different from the first setting mode. When the operation mode is the bright priority mode of the first operation mode, the M different pattern images GOP include the fifth pattern images having the gradation "1023" corresponding to the second gradation and the sixth pattern images each having the gradations "876" and "730" corresponding to the third gradation darker than the second gradation. In addition, when the operation mode is the dark priority mode of the first operation mode, the M different pattern images include the fifth pattern image and the seventh pattern images each having the gradations "292" and "146" corresponding to the fourth gradation darker than the third gradation.

Accordingly, the user U can designate an appropriate correction operation mode for the brightness of the target image GO.

In addition, in the modification, when the operation mode is the second operation mode and is the user designation mode, the first processing device 100 receives an input of a gradation. In addition, the N different pattern images GOP in the user designation mode include the fifth pattern image and the eighth pattern image having the received gradation.

Accordingly, the user U can perform the correction targeting a desired gradation in a short time.

In addition, in the modification, when the operation mode is the second operation mode and is the automatic mode, the first processing device 100 executes the following series of processes. That is, the series of processes include: displaying the black fourth pattern image GOP4; acquiring the captured image data DC of the fourth captured image acquired by imaging the fourth projection image GP4 obtained by projection of the fourth pattern image GOP4; projecting the ninth pattern image having the fifth gradation different from the gradation of the fourth pattern image GOP4; acquiring the captured image data DC of the ninth captured image acquired by imaging the ninth projection image obtained by projection of the ninth pattern image; and designating, based on pieces of captured image data DC of the fourth captured image and the ninth captured image, the tenth pattern image having the gradation in which the contrast ratio with respect to the fourth captured image is equal to or greater than the predetermined threshold.

According to the series of processes, since an inappropriate gradation with respect to the brightness of the ambient light is excluded from the measurement target, the decrease in the accuracy of the correction is prevented, and since the measurement target is reduced, the correction can be performed in a short time.

Modification 3

Figure 8:
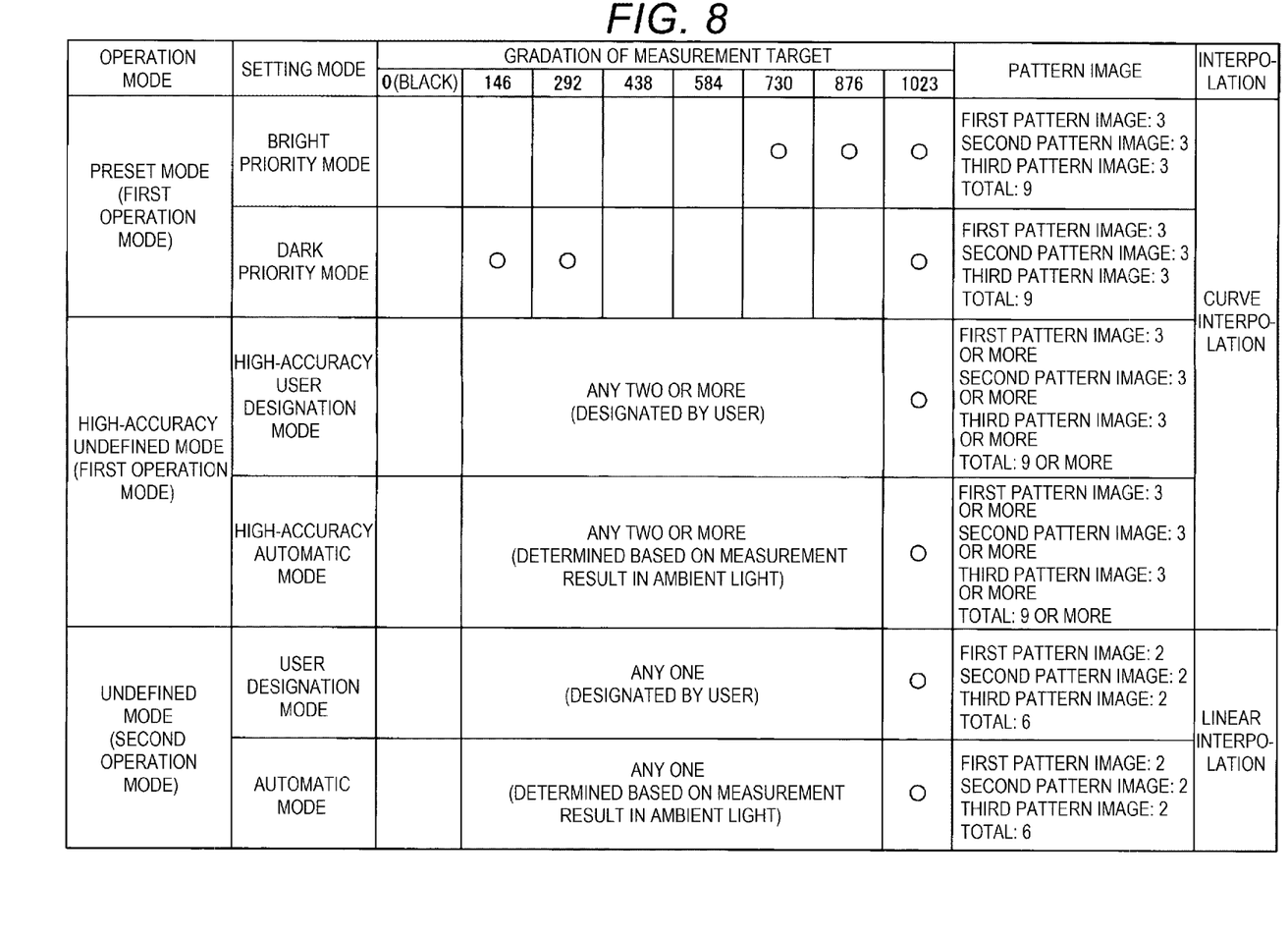
FIG. 8 is a diagram showing operation modes according to a modification of the present disclosure.

In Modification 2 described above, the operation mode may further include a high-accuracy undefined mode as shown in FIG. 8. The high-accuracy undefined mode is a mode in which the number of gradations of the measurement target is larger than that in the undefined mode described above, that is, a mode in which the number of gradations of the measurement target is three or more, and corresponds to the first operation mode.

In the modification, the high-accuracy undefined mode includes a high-accuracy user designation mode corresponding to the above-described user designation mode and a high-accuracy automatic mode corresponding to the above-described automatic mode. In the high-accuracy user designation mode, the number of gradations designated by the user U is set to two or more, and in the high-accuracy automatic mode, the number of gradations determined by the ambient light is set to two or more.

According to the modification, the user U can perform the correction with higher accuracy by designating more gradations as the measurement targets. In addition, the user U can perform the correction according to the ambient light with higher accuracy.

Modification 4

In the above-described embodiment, the first processing device 100 of the projector 10 determines the operation mode based on the operation of the user U. However, the first processing device 100 may designate an appropriate mode from the "high-accuracy mode", the "intermediate mode", and the "short-time mode" based on an input method of the target image GO from the image supply device 20.

Specifically, the first processing device 100 further executes processes of setting the operation mode to the 0th operation mode or the first operation mode when the image data DG of the target image GO is received from the image supply device 20 according to a first input method, and setting the operation mode to the second operation mode when the image data DG of the target image GO is received from the image supply device 20 according to a second input method different from the first input method.

The first input method is, for example, a method by which the image data DG having relatively high image quality can be input to the projector 10, and the second input method is a method by which the image data DG having lower image quality than the first input method is input to the projector 10. The first input method corresponds to an input method based on standards such as a high-definition multimedia interface (HDMI) and a DisplayPort. The HDMI is a registered trademark. The second input method corresponds to, for example, a method of inputting the image data DG to the projector 10 through an RCA terminal or an S terminal. In addition, in the method of inputting the image data DG to the projector 10 through wireless communication, a situation in which a data transmission speed is low or a delay is large due to a bad reception situation of radio waves or the like also corresponds to the second input method.

According to the modification, the operation mode can be appropriately corrected according to image quality of the target image GO.

Modification 5

In Modification 2 and Modification 3 described above, the first processing device 100 of the projector 10 may designate the bright priority mode as the first setting mode and the dark priority mode as the second setting mode based on a histogram of the target image GO.

Specifically, the first processing device 100 of the projector 10 further executes processes of receiving an input of the image data DG of the target image GO from the image supply device 20, acquiring the histogram of the target image GO based on the image data DG, and setting the first setting mode or the second setting mode based on the histogram. For example, the first processing device 100 obtains the number of bright pixels and the number of dark pixels included in the target image GO based on the histogram, and designates the bright priority mode when the number of bright pixels is larger than the number of dark pixels, and designates the dark priority mode when the number of dark pixels is larger than the number of bright pixels. When the target image GO is a frame image of a moving image, the first processing device 100 may set the first setting mode or the second setting mode based on an average value of histograms of a plurality of frame images.

According to the modification, the correction of an appropriate operation mode is automatically designated according to the histogram of the target image GO, and the correction is executed.

Modification 6

In the above-described embodiment, the display system 1 may further include an information processing device including a second processing device. Examples of the information processing device include a personal computer, a mobile phone, and a smartphone. The functional units implemented by the first processing device 100 of the projector 10 executing the image correction program 122 may be implemented by the second processing device of the information processing device.

Other Modifications

In the present disclosure, the projector 10 may be another display device that displays a display image. For example, the display device may be a liquid crystal display device that displays an image on a liquid crystal display panel, a display device that displays an image on an organic EL panel, or a self-luminous display device such as a monitor, a liquid crystal television, and a flat panel display.

In the present disclosure, the correction of the display image is not limited to the color correction, and may be another correction.

3. Summary of Present Disclosure

Hereinafter, a summary of the present disclosure will be added.

Appendix 1

A display method includes: sequentially displaying M different pattern images, by a display device configured to display a display image, when an operation mode of the display device is a first operation mode, M being a natural number; correcting the display image based on a first captured image group acquired by imaging the M different pattern images; sequentially displaying N different pattern images by the display device when the operation mode of the display device is a second operation mode different from the first operation mode, N being a natural number smaller than the M; acquiring a second captured image group acquired by imaging the N different pattern images; and correcting the display image based on the second captured image group.

According to Appendix 1, by the first operation mode, it is possible to perform the correction with higher accuracy than that in the second operation mode. In addition, by the second operation mode, it is possible to perform the correction in a time shorter than that in the first operation mode.

Appendix 2

In the display method according to Appendix 1, the N is 4 or more, and the N different pattern images include one or more first pattern images having red, one or more second pattern images having green, one or more third pattern images having blue, and single fourth pattern image having black.

According to Appendix 2, the color correction of the display image can be performed with a short time.

Appendix 3

In the display method according to Appendix 2, the M is 7 or more, and the M different pattern images include two or more of the first pattern images having different gradations from each other, two or more of the second pattern images having different gradations from each other, two or more of the third pattern images having different gradations from each other, and the single fourth pattern image, the correcting the display image based on the first captured image group includes correcting the display image with a correction value, that is calculated using a curve interpolation, based on the first captured image group, and the correcting the display image based on the second captured image group includes correcting the display image with a correction value, that is calculated using a linear interpolation different from the curve interpolation, based on the second captured image group.

According to Appendix 3, by the first operation mode, the correction value of the color correction is obtained with accuracy higher than that in the second operation mode. By the second operation mode, the correction value of the color correction is obtained in a time shorter than that in the first operation mode.

Appendix 4

In the display method according to Appendix 1, the first operation mode includes a first setting mode and a second setting mode different from the first setting mode, when the operation mode is the first setting mode of the first operation mode, the M different pattern images include a fifth pattern image having a second gradation, and a sixth pattern image having a third gradation which is a gradation darker than the second gradation, and when the operation mode is the second setting mode of the first operation mode, the M different pattern images include the fifth pattern image and a seventh pattern image having a fourth gradation which is a gradation darker than the third gradation.

According to Appendix 4, an appropriate correction operation mode can be executed according to the brightness of the display image.

Appendix 5

The display method according to Appendix 4 further includes: receiving a gradation input when the operation mode is the first operation mode or the second operation mode. The M different pattern images or the N different pattern images include the fifth pattern image, and an eighth pattern image having the input gradation.

According to Appendix 5, the correction operation mode targeting a desired gradation can be executed through the user.

Appendix 6

The display method according to Appendix 5 further includes: when the operation mode is the first operation mode or the second operation mode, displaying the black fourth pattern image; acquiring a fourth captured image acquired by imaging the fourth pattern image; displaying a ninth pattern image having a fifth gradation different from the gradation of the fourth pattern image; acquiring a ninth captured image acquired by imaging the ninth pattern image; designating, based on the fourth captured image and the ninth captured image, a tenth pattern image having a gradation in which a contrast ratio with the fourth captured image is equal to or greater than a predetermined threshold.

According to Appendix 6, it is possible to perform the correction using the pattern image having the gradation in which an inappropriate gradation with respect to the brightness of ambient light is excluded.

Appendix 7

The display method according to Appendix 1 further includes: receiving an operation of designating the operation mode; setting the operation mode to the first operation mode when the received operation is an operation of designating the first operation mode; and setting the operation mode to the second operation mode when the received operation is an operation of designating the second operation mode.

According to Appendix 7, the user can select a desired operation mode from the first operation mode and the second operation mode by an operation.

Appendix 8

The display method according to Appendix 7 further includes: setting the operation mode to the first operation mode when the display device displays the display image based on an image signal input by a first input method; and setting the operation mode to the second operation mode when the display device displays the display image based on an image signal input by a second input method different from the first input method.

According to Appendix 8, the operation mode can be appropriately corrected according to image quality of the display image.

Appendix 9

The display method according to Appendix 4 further includes: receiving an input of an image signal; acquiring a histogram of an image indicated by the image signal; and designating the first setting mode or the second setting mode based on the histogram.

According to Appendix 9, the operation mode can be appropriately corrected according to the histogram of the display image.

Appendix 10

A display system includes: a display device configured to display a display image; an imaging device; and a processing device configured to execute: sequentially displaying M different pattern images by the display device when an operation mode of the display device is a first operation mode, M being a natural number, correcting the display image based on a first captured image group acquired by the imaging device imaging the M different pattern images, sequentially displaying N different pattern images by the display device when the operation mode of the display device is a second operation mode different from the first operation mode, N being a natural number smaller than the M, acquiring a second captured image group acquired by the imaging device imaging the N different pattern images, and correcting the display image based on the second captured image group.

According to Appendix 10, the same effect as that of Appendix 1 can be obtained.

Appendix 11

A program causes a computer to execute: sequentially displaying M different pattern images, by a display device configured to display a display image, when an operation mode of the display device is a first operation mode, M being a natural number; correcting the display image based on a first captured image group acquired by imaging the M different pattern images; sequentially displaying N different pattern images by the display device when the operation mode of the display device is a second operation mode different from the first operation mode, N being a natural number smaller than the M; acquiring a second captured image group acquired by imaging the N different pattern images; and correcting the display image based on the second captured image group.

According to Appendix 11, the same effect as that of Appendix 1 can be obtained.

What is claimed is:
1. A display method comprising:
sequentially displaying M different pattern images, by a display device configured to display a display image, when an operation mode of the display device is a first operation mode, M being a natural number;

correcting the display image based on a first captured image group acquired by imaging the M different pattern images;

sequentially displaying N different pattern images by the display device when the operation mode of the display device is a second operation mode different from the first operation mode, N being a natural number smaller than the M;

acquiring a second captured image group acquired by imaging the N different pattern images; and correcting the display image based on the second captured image group, wherein the number N is 4 or more, and the N different pattern images include
one or more first pattern images having red,
one or more second pattern images having green,
one or more third pattern images having blue, and
a single fourth pattern image having black.

2. The display method according to claim 1, wherein the number M is 7 or more, and the M different pattern images include
two or more of the first pattern images having different gradations from each other,
two or more of the second pattern images having different gradations from each other,
two or more of the third pattern images having different gradations from each other, and
the single fourth pattern image, the correcting the display image based on the first captured image group includes correcting the display image with a correction value, that is calculated using a curve interpolation, based on the first captured image group, and the correcting the display image based on the second captured image group includes correcting the display image with a correction value, that is calculated using a linear interpolation different from the curve interpolation, based on the second captured image group.

3. The display method according to claim 1, wherein the first operation mode includes
a first setting mode and a second setting mode different from the first setting mode, when the operation mode is the first setting mode of the first operation mode, the M different pattern images include
a fifth pattern image having a second gradation, and
a sixth pattern image having a third gradation which is a gradation darker than the second gradation, and when the operation mode is the second setting mode of the first operation mode, the M different pattern images include
the fifth pattern image and a seventh pattern image having a fourth gradation which is a gradation darker than the third gradation.

4. The display method according to claim 3, further comprising:

receiving a gradation input when the operation mode is the first operation mode or the second operation mode, wherein the M different pattern images or the N different pattern images include
the fifth pattern image, and
an eighth pattern image having the input gradation.

5. The display method according to claim 4, further comprising:

when the operation mode is the first operation mode or the second operation mode, displaying the black fourth pattern image;

acquiring a fourth captured image acquired by imaging the fourth pattern image;

displaying a ninth pattern image having a fifth gradation different from the gradation of the fourth pattern image;

acquiring a ninth captured image acquired by imaging the ninth pattern image; and designating, based on the fourth captured image and the ninth captured image, a tenth pattern image having a gradation in which a contrast ratio with the fourth captured image is equal to or greater than a predetermined threshold.

6. The display method according to claim 3, further comprising:

receiving an input of an image signal;

acquiring a histogram of an image indicated by the image signal; and designating the first setting mode or the second setting mode based on the histogram.

7. The display method according to claim 1, further comprising:

receiving an operation of designating the operation mode;

setting the operation mode to the first operation mode when the received operation is an operation of designating the first operation mode; and setting the operation mode to the second operation mode when the received operation is an operation of designating the second operation mode.

8. The display method according to claim 7, further comprising:

setting the operation mode to the first operation mode when the display device displays the display image based on an image signal input by a first input method; and setting the operation mode to the second operation mode when the display device displays the display image based on an image signal input by a second input method different from the first input method.

9. A display system comprising:

a display device configured to display a display image;

an imaging device; and one or more processors programmed to execute
sequentially displaying M different pattern images by the display device when an operation mode of the display device is a first operation mode, M being a natural number,
correcting the display image based on a first captured image group acquired by the imaging device imaging the M different pattern images,
sequentially displaying N different pattern images by the display device when the operation mode of the display device is a second operation mode different from the first operation mode, N being a natural number smaller than the M,
acquiring a second captured image group acquired by the imaging device imaging the N different pattern images, and
correcting the display image based on the second captured image group, wherein the number N is 4 or more, and the N different pattern images include
one or more first pattern images having red,
one or more second pattern images having green,
one or more third pattern images having blue, and
a single fourth pattern image having black.

10. The display system according to claim 9, wherein
the number M is 7 or more, and
the M different pattern images include
  two or more of the first pattern images having different gradations from each other,
  two or more of the second pattern images having different gradations from each other,
  two or more of the third pattern images having different gradations from each other, and
  the single fourth pattern image,
the correcting the display image based on the first captured image group includes correcting the display image with a correction value, that is calculated using a curve interpolation, based on the first captured image group, and
the correcting the display image based on the second captured image group includes correcting the display image with a correction value, that is calculated using a linear interpolation different from the curve interpolation, based on the second captured image group.

11. The display system according to claim 9, wherein
the first operation mode includes
  a first setting mode and a second setting mode different from the first setting mode,
when the operation mode is the first setting mode of the first operation mode, the M different pattern images include
  a fifth pattern image having a second gradation, and
  a sixth pattern image having a third gradation which is a gradation darker than the second gradation, and
when the operation mode is the second setting mode of the first operation mode, the M different pattern images include
  the fifth pattern image and a seventh pattern image having a fourth gradation which is a gradation darker than the third gradation.

12. The display system according to claim 11, further comprising:
  receiving a gradation input when the operation mode is the first operation mode or the second operation mode, wherein
  the M different pattern images or the N different pattern images include
    the fifth pattern image, and
    an eighth pattern image having the input gradation.

13. The display system according to claim 12, wherein the one or more processors are further programmed to execute when the operation mode is the first operation mode or the second operation mode:
  displaying the black fourth pattern image;
  acquiring a fourth captured image acquired by imaging the fourth pattern image;
  displaying a ninth pattern image having a fifth gradation different from the gradation of the fourth pattern image;
  acquiring a ninth captured image acquired by imaging the ninth pattern image; and
  designating, based on the fourth captured image and the ninth captured image, a tenth pattern image having a gradation in which a contrast ratio with the fourth captured image is equal to or greater than a predetermined threshold.

14. The display system according to claim 9, wherein the one or more processors are further programmed to execute:
  receiving an operation of designating the operation mode;
  setting the operation mode to the first operation mode when the received operation is an operation of designating the first operation mode; and
  setting the operation mode to the second operation mode when the received operation is an operation of designating the second operation mode.

15. The display system according to claim 14, wherein the one or more processors are further programmed to execute:
  setting the operation mode to the first operation mode when the display device displays the display image based on an image signal input by a first input method; and
  setting the operation mode to the second operation mode when the display device displays the display image based on an image signal input by a second input method different from the first input method.

16. The display system according to claim 11, wherein the one or more processors are further programmed to execute:
  receiving an input of an image signal;
  acquiring a histogram of an image indicated by the image signal; and
  designating the first setting mode or the second setting mode based on the histogram.

17. A non-transitory storage medium storing a program, the program causing a computer to execute:
  sequentially displaying M different pattern images, by a display device configured to display a display image, when an operation mode of the display device is a first operation mode, M being a natural number;
  correcting the display image based on a first captured image group acquired by imaging the M different pattern images;
  sequentially displaying N different pattern images by the display device when the operation mode of the display device is a second operation mode different from the first operation mode, N being a natural number smaller than the M;
  acquiring a second captured image group acquired by imaging the N different pattern images; and
  correcting the display image based on the second captured image group, wherein
  the number N is 4 or more, and
  the N different pattern images include
    one or more first pattern images having red,
    one or more second pattern images having green,
    one or more third pattern images having blue, and
    a single fourth pattern image having black.

* * * * *